United States Patent [19]

Carr et al.

[11] 4,241,150

[45] Dec. 23, 1980

[54] METHOD FOR CONTROL OF EDGE EFFECTS OF OXIDANT ELECTRODE

[75] Inventors: Peter Carr, Utica; Chen H. Chi, Sterling Heights, both of Mich.

[73] Assignee: Energy Development Associates, Inc., Madison Heights, Mich.

[21] Appl. No.: 62,109

[22] Filed: Jul. 30, 1979

[51] Int. Cl.³ .............................................. H01M 2/38
[52] U.S. Cl. ...................................... 429/51; 429/199; 429/229; 429/105
[58] Field of Search ............................... 429/50–52, 429/199, 229–231, 101, 105

[56] References Cited

U.S. PATENT DOCUMENTS

| | | | |
|---|---|---|---|
| 3,316,124 | 4/1967 | Kronenberg | 117/227 |
| 3,713,888 | 1/1973 | Symons | 429/51 |
| 3,773,560 | 11/1973 | Bjorkman | 429/51 |
| 3,813,301 | 5/1974 | Carr | 429/50 |
| 3,823,036 | 7/1974 | Bjorkman, Jr. | 429/70 |
| 3,881,956 | 5/1975 | Williams | 429/51 X |
| 4,049,880 | 9/1977 | Hart | 429/51 X |
| 4,071,660 | 1/1978 | Hart | 429/199 X |
| 4,167,607 | 9/1979 | de Nora et al. | 429/15 |

Primary Examiner—Charles F. LeFevour
Attorney, Agent, or Firm—Burton, Parker & Schramm

[57] ABSTRACT

Described is an electrode assembly comprising:

a. a porous electrode having a first and second exterior face with a cavity formed in the interior between said exterior faces thereby having first and second interior faces positioned opposite the first and second exterior faces;

b. a counter electrode positioned facing each of the first and second exterior faces of the porous electrode;

c. means for passing an oxidant through said porous electrode; and d. screening means for blocking the interior face of the porous electrode a greater amount than the blocking of the respective exterior face of the porous electrode, thereby maintaining a differential of oxidant electrode surface between the interior face and the exterior face.

The electrode assembly is useful in a metal, halogen, halogen hydrate electrical energy storage device.

9 Claims, 8 Drawing Figures

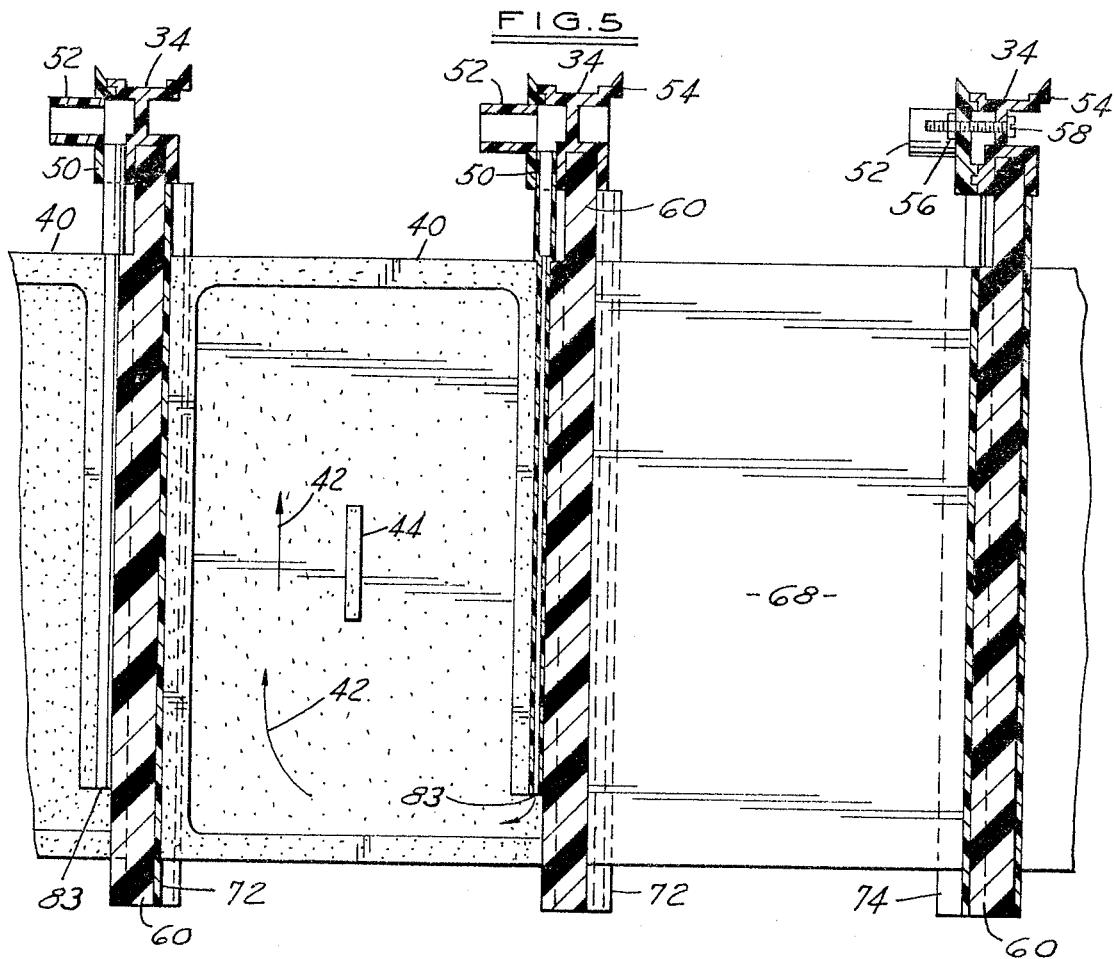
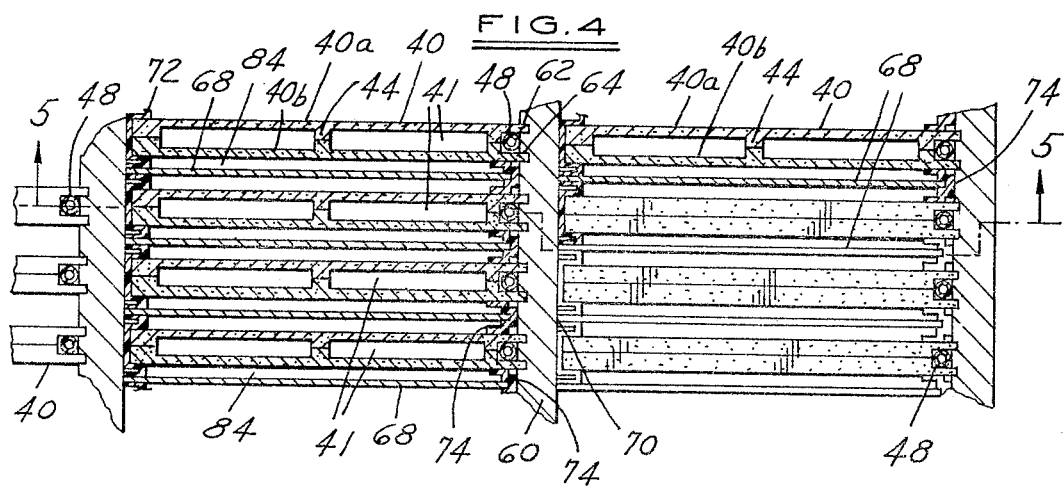

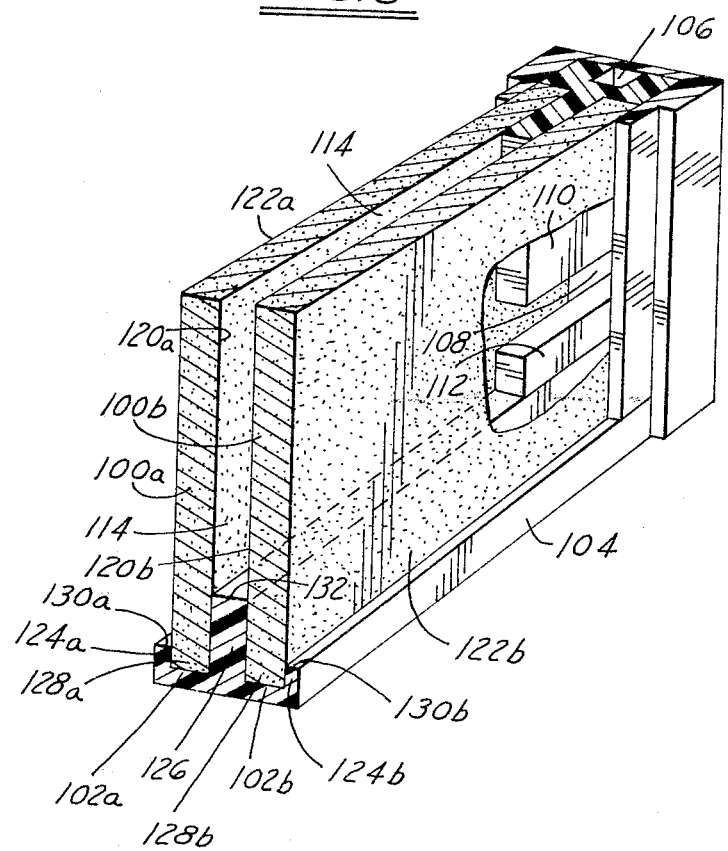

METHOD FOR CONTROL OF EDGE EFFECTS OF OXIDANT ELECTRODE

BACKGROUND OF THE INVENTION

The invention is concerned with electrode assemblies and use of same in electrical energy storage devices (EESD), especially a rechargeable EESD.

An EESD has utility in electric vehicle markets or in stationary power systems. Both of these markets may have a requirement to electrodeposit the reducible metal in a smooth dense manner and to remove it uniformly during discharge. In the electric vehicle market, there may be multiple shallow depth discharges occurring prior to a complete discharge. During discharge, difficulty has arisen when an oxidant is passed through a porous electrode. It may be significantly more electrochemically active than the counter electrode due to its high surface area. Due to the increase in current density, the metal of the counter electrode is removed quickly during discharge. Additionally, chemical corrosion of the reducible metal of the EESD by the presence of the oxidant in the electrolyte has a tendency to decrease the effectiveness of any EESD. These problems are collectively referred to as the edge activity of an oxidant electrode. The control of the edge effects of a porous oxidant electrode is the object of the present invention.

SUMMARY OF INVENTION

The invention is concerned with an electrode assembly comprising;

a. a porous electrode having a first and second exterior face with a cavity formed in the interior between said exterior faces thereby having first and second interior faces positioned opposite the first and second exterior faces;

b. a counter electrode positioned facing each of the first and second exterior faces of the porous electrode;

c. means for passing an oxidant through said porous electrode; and d. screening means for blocking the interior face of the porous electrode a greater amount than the respective exterior face of the porous electrode, thereby maintaining a differential of electrode surface between the interior face and the exterior face.

The invention is also concerned with a method of discharging an electrical energy storage device comprising the steps;

1. providing a first electrode comprised of an electrochemically reducible substance;

2. providing a porous electrode having a first and second exterior face with a cavity formed in the interior between said exterior faces, thereby having first and second interior faces positioned opposite the first and second exterior faces;

3. providing a current carrying electrolyte between said electrodes;

4. passing an oxidant through said porous electrode;

5. screening the electrochemical activity of the porous electrode by blocking the interior face a greater amount than the respective exterior face of the porous electrode, thereby maintaining a differential of electrode surface between the interior face and the exterior face; and 6. closing the circuit between the first electrode and the porous electrode, thereby oxidizing the substance at the first electrode and reducing the oxidant at the porous electrode.

BRIEF DESCRIPTION OF THE DRAWINGS

FIG. 4 is a sectional view substantially along lines 4—4 of FIG. 2;

FIG. 5 is a sectional view taken along lines 5—5 of FIG. 4;

FIG. 8 is a side sectional view of a portion of the electrode assembly of the present invention showing the internal/external masking or screening effect.

DETAILED DESCRIPTION OF THE INVENTION

Figure 1:
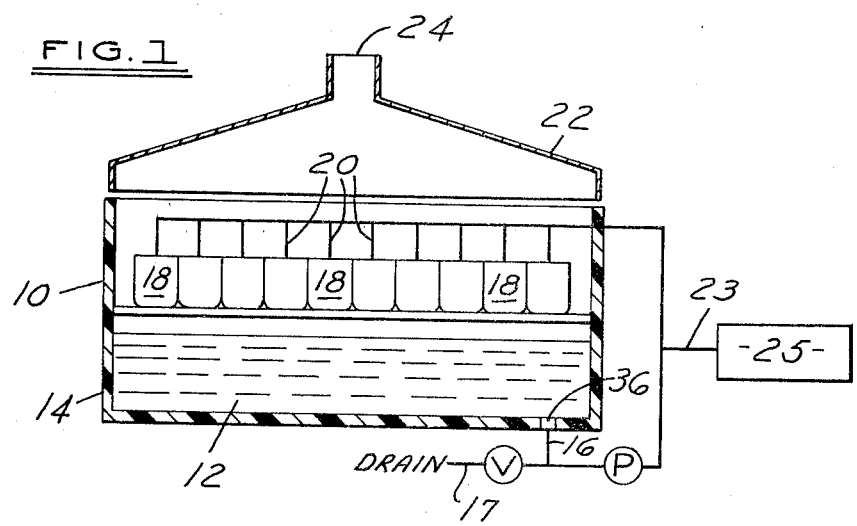
FIG. 1 is a diagrammatic view of the process of the present invention.

When porous electrodes are used in an EESD, their electrochemical activity must be taken into consideration during the discharge reaction because the oxidant will be reduced not only at the exterior electrode surface (generally longitudinal face) of the electrode, but also in the interior portion of the porous electrode.

In the most preferred manner the electrochemical reactions of discharge are:

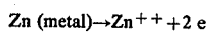

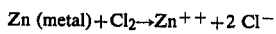

It has been found, therefore, to control the edge effects of the porous electrode there should be a means for decreasing or screening or masking the electrochemical activity or the porous electrode by having a differential of a mechanical mask on the front or exterior portion of the electrode (exterior face) versus the interior face or internal mask of the electrode.

The positive electrodes of the present invention are primarily porous electrodes and may be carbonaceous electrodes, that is, comprised of carbon, activated carbon, graphite, activated graphite and mixtures thereof with or without other fillers that may be present in the carbonaceous electrode. The porous electrode may also be comprised of a film forming metal, such as titanium, titanium alloys, tantalum, tantalum alloys, zirconium, zirconium alloys, niobium, niobium alloys, tungsten, tungsten alloys and mixtures thereof. Any of the electrodes may be further comprised of catalytic materials well known in the art as noble metals as gold and silver and the like or Group VIII of the Periodic Table of Elements (HANDBOOK OF CHEMISTRY AND PHYSICS, 55th ed., 1974–1975, published by CRC Press) such as ruthenium, rhodium, palladium, osmium, nickel, iridium, platinum and the oxides thereof and mixtures thereof and the like. Generally, when the film forming metals are used, a catalyst is also used, e.g., ruthenized titanium.

The electrode assemblies may be useful in any EESD or any electrochemical reaction where a porous electrode is used, such as the utilization of hydrogen, oxygen, halogens, such as chlorine, bromine, iodine, fluorine, halodates, such as chlorates, bromates, the primary or secondary fuel cells, such as the metal hydride type, a metal halogen system and the like. Most preferred is the EESD of the metal halogen hydrate type such as the metal halogen device described in U.S. Pat. No. 3,713,888 or 4,049,880, which are hereby incorporated by reference.

Operations of a zinc chloride battery system are described in Electric Power Research Institute (EPRI) EM-249 Report for Project 226-1 Interium Report, September 1976; EM-1051, Parts 1-4, Project 226-3 Interim Report, April 1979; Cost Analysis of 50 KWH Zinc-Chlorine Batteries for Mobile Applications, U.S. Dept. of Energy Report COO-2966-1, January 1978 and Safety and Environmental Aspects of Zinc-Chloride Hydrate Batteries for Electric Applications, U.S. Dept. of Energy Report COO-2966-2, March 1978, herein incorporated by reference.

It has been found highly desirable that the electrode assemblies of the present invention are particularly useful in EESD where a current carrying electrolyte is employed such as an aqueous electrolyte. Any of the electrolytes well known in the art for the EESDs as described above may be employed. Electrolytes may be acidic or alkaline. The most preferred electrolyte is that useful in the metal halogen hydrate device described in the aforementioned patents, most preferably, a metal halogen device such as a zinc chlorine EESD.

It is preferred that when carbonaceous electrodes are employed in the electrode assembly in the present invention that the electrodes be activated in accordance with the case, Ser. No. 062,108 filed July 30, 1979, entitled ACTIVATING CARBONACEOUS ELECTRODES, filed concurrently herewith. The electrode assembly are also preferably used as bipolar electrodes in accordance with U.S. Pat. No. 4,100,332, herein incorporated by reference.

Turning now to a discussion of the drawings, FIG. 1 is a schematic diagram of the electrode compartment of a preferred EESD such as the zinc chlorine chlorine hydrate system. In a container 10, sealed in place is an electrolyte reservoir 12 within a plastic reservoir 14. The electrolyte reservoir 12 functions as a sump from which electrolyte is pumped via line 16 by means of pump P into each of the stacks or submodules 18 via independent conduit 20. A value V is placed in line 16 so that the electrolyte may be changed or dumped as desired. While the apparatus 10 is shown as containing a hood 22, it is to be appreciated that the design of such equipment may be modified to fit the desired characteristics of the electric vehicle or the standing power market. It is further to be appreciated that the electrolyte that is flowing from the sump 12 via line 16 into submodules 18 can be heated or cooled as is desired by auxillary apparatus (not shown).

Figure 2:
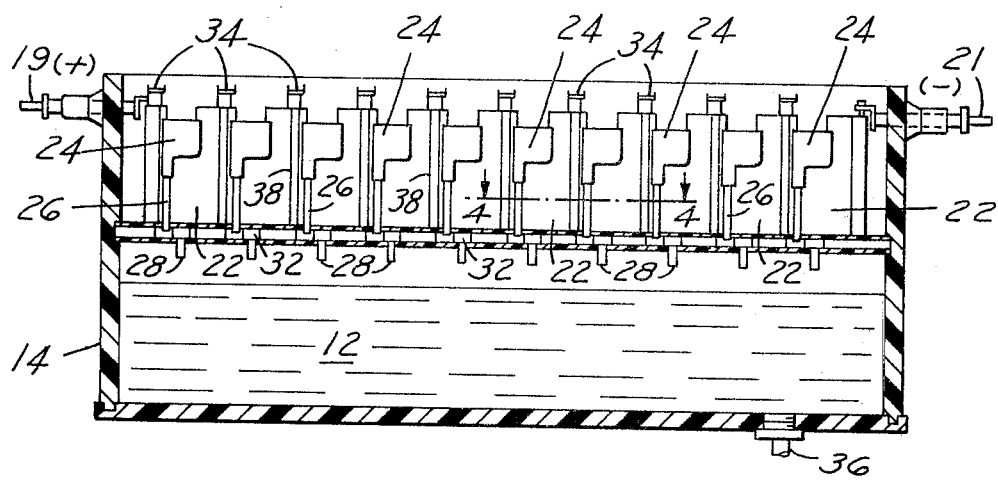
FIG. 2 is a sectional view of a submodule of assembled electrolytic cells.
Figure 3:
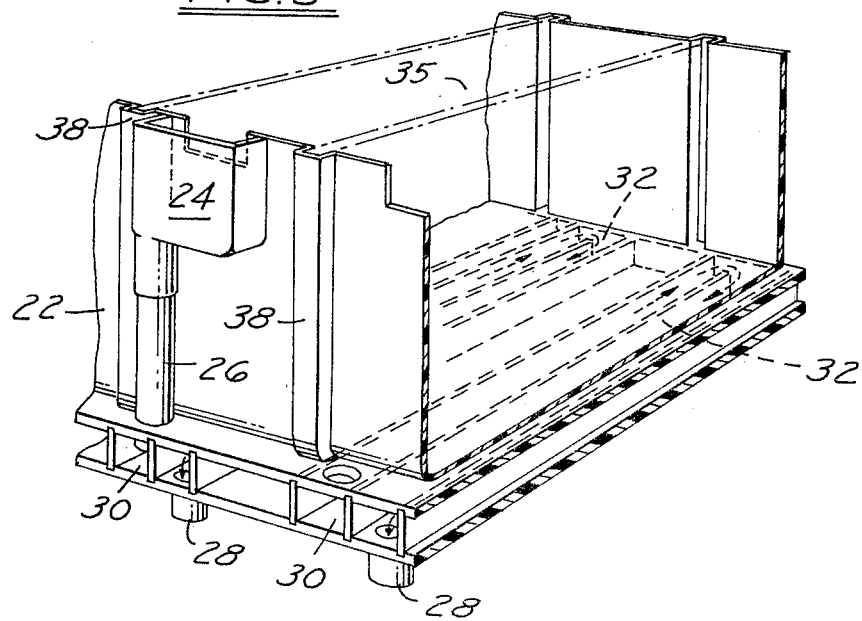
FIG. 3 is a case for supporting a submodule stack of electrolytic cells useful in the process of the present invention.

FIG. 2 is a cross-section of the electrochemical apparatus of the present invention showing the electrolyte sump 12 being retained in a tray 22 and a series of electrical cells arranged in bipolar fashion having current terminals 19 and 21. The current is passed through the current terminals to conventional bus bars which in turn are connected to connector studs (not shown), thereby passing the current to each of the individual cells in each submodule. Each stack of electrodes is retained in a submodule tray 22, a sectional view of which is shown in FIG. 3. The submodule tray has an electrolyte drain cup 24 to which is attached a conduit 26 which in turn is connected to a passageway for movement of electrolyte away from the submodule to the sump via exit line 28. In order to prevent parasitic losses during the charging of the stack and to decrease the short circuiting that could possibly occur, the electrolyte passes down the conduit 26 through a pair of opposed serpentine like channels, best shown in FIG. 3 as channel 30 and 32 respectively with flow in the direction of the arrows.

The most preferred embodiment is that an electrolyte is flowing through and past the electrodes during the electrolytic reaction. To provide for the flowing electrolyte, an electrolyte distribution manifold 34 is provided for each submodule. The electrolyte flows from the sump 12 out exit port 36 and is pumped back to the submodule.

A sectional view showing a portion of a stack of electrodes with a porous cabonaceous electrode, which, in the most preferred embodiment, as the chlorine electrode of a zinc chlorine electrical energy storage device, is shown in FIG. 4. The submodule, which is a stack 18 of ten cells is inserted into the interior 35 of the submodule tray 22 wherein the electrolyte distribution manifold 34 would be joined with the submodule tray by positioning the manifold into channels 38.

The porous chlorine electrode 40 is arranged such that a pair of porous carbon plates 40a and 40b are joined together forming a cavity 41 to allow passage of electrolyte therethrough as shown by arrows 42. Gas venting holes (not shown) may be provided at the top of the porous chlorine electrode. The tops of three chlorine electrodes are shown in the right side of FIG. 4 while the remaining portion of FIG. 4 is a sectional view. To prevent distortion of the porous chlorine electrodes, stub 44 is present in the middle of the chlorine electrode to give strength thereto. The porous chlorine electrodes are manufactured to have an indented portion 46, in which the electrolyte feed tube 48 may be inserted. The electrolyte feed tube in turn is connected to the internal electrolyte distribution manifold at point 50. The electrolyte distribution manifold is comprised of a pair of complementary members 52 and 54 which are fastened together by nuts 56 and bolts 58.

A bipolar intermediate bus 60 is machined to receive the chlorine electrodes at points 62 and 64, while adjacent thereto is the metal or zinc electrode 68 which fits into the intermediate bipolar bus at point 70. To prevent short circuiting, to insure tight fit, to control discharge rates of chlorine electrode, and to control the edge effects thereof, spacers 72 and 74 join together the chlorine and zinc electrodes which are arranged in bipolar fashion. The masking or screening effect is performed by spacers 72 and 74.

In operation the electrolyte is flowed from the sump 12 through external manifold 80 into interior manifold 82 which is a conduit which is connected to the electrolyte distribution manifold at point 84. From the electrolyte distribution manifold, the electrolyte is passed through tubes 48 whereby the electrolyte exits from the tube at the bottom of the halogen electrode at point 83 and the electrolyte flows through the porous electrodes up the intercell spacing 84 into drain cup 24 down the exit conduit 26, into channels 30 and 32 as described above and out the exit 28 back to the sump.

The separation between the porous halogen electrode and the metal electrode ranges from about 40 to about 250 mils, preferably 80 mils (2 mm).

The differential masking of the present invention is graphically shown in FIG. 8. The porous electrode is comprised of two elements 100a and 100b which are normally both comprised of a porous structure joined together at top (not shown) and bottom. FIG. 8 shows a "W" shaped element whereby the elements 100a and 100b fit within grooves 102a and 102b respectively formed from an inert plastic as Kynar (trademark of Penwalt Company for a fluoroplastic). The porous electrode of FIG. 8 is similar to the porous electrode of FIG. 4. Electrolyte distribution inlet 106 functions as electrolyte feed tube 48 of FIG. 6. For ease of distribution of electrolyte an inlet channel 108 is formed between members 110 and 112. The electrolyte flows from the sump 12 down distribution inlet 106 to near the base of the porous electrode, out channel 108 and fills cavity 114 and then passes through porous electrodes 100a and 100b, first through internal faces 120a and 120b respectively and out exterior faces 122a and 122b.

During operation (charge and discharge) of an EESD, the longitudinal faces 122a and 122b are blocked by an external mask 124a and 124b which physically covers the longitudinal (exterior) electrode face opposite the counter electrode 68. The internal mask 126 also physically blocks the interior faces of the porous electrode. A differential in physical screening or masking of the (external) longitudinal face versus the (internal) interior faces is maintained such that the height of the external mask (measured from the base of the porous electrode 128a or 128b to the top of external mask 130a or 130b, respectively) is much less than the height of the internal mask (measured from the base of the porous electrode 128a or 128b to the top of the internal mask 132). The differential between the interior screen or mask and the exterior mask ranges from about 0.05" (1.27 mm) to about 0.3" (7.62 mm), preferably 0.18" (4.57 mm).

Figure 6:
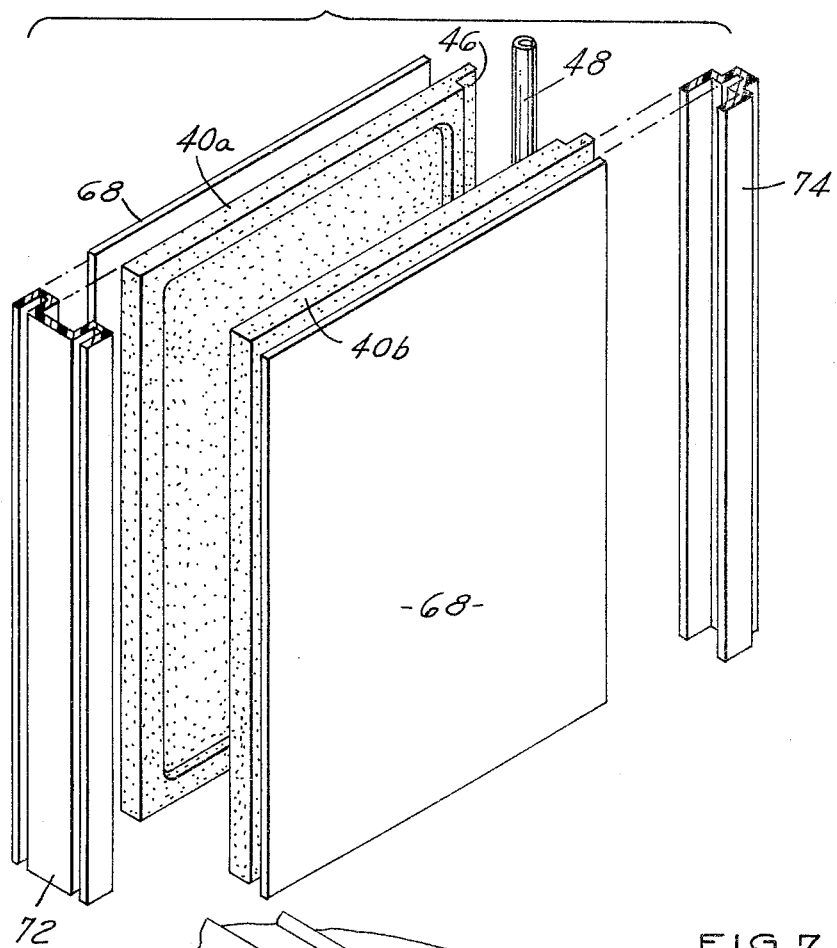
FIG. 6 is an exploded view of the electrodes useful in the process of the present invention.
Figure 7:
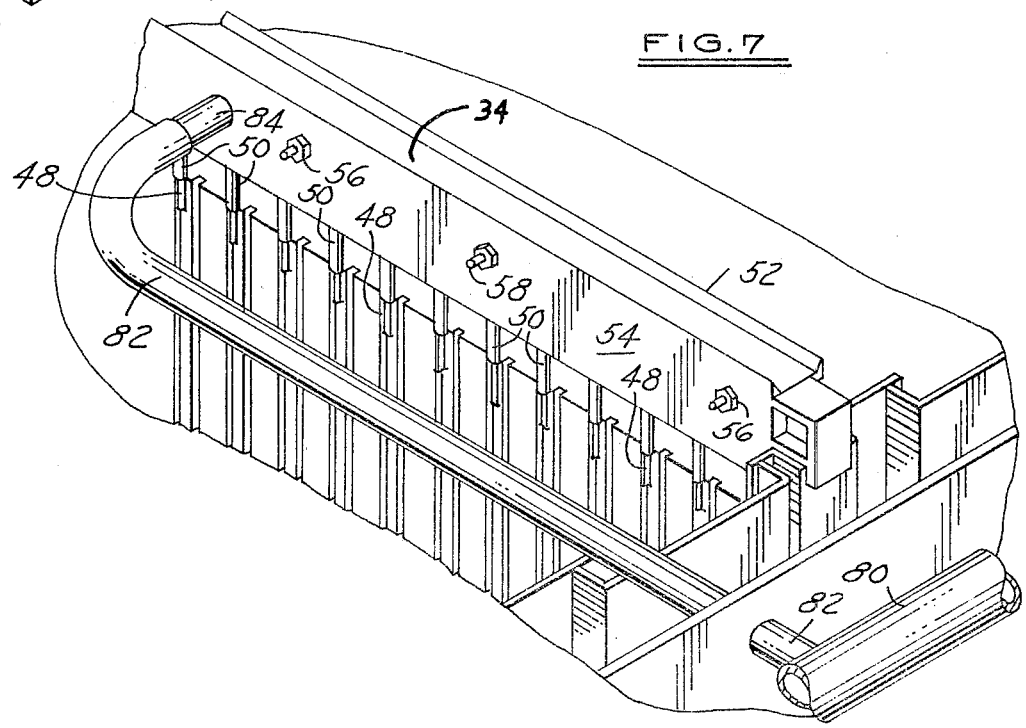
FIG. 7 is a sectional view of the cell distribution manifold useful in the process of the present invention.

Spacers 72 and 74 perform the same function on the sides of the electrodes shown in FIGS. 4 and 6 as the internal and external screen or mask at the base of the porous electrode of FIG. 8.

It is to be appreciated that the cells and submodule described herein can be combined in series or parallel relationship as is well known in the art.

Any means for storing and/or charging any oxidant can be used. The storage compartment 25 is connected to line 16 for operation during charging or during discharge of a primary or secondary (electrically rechargeable) EESD via line 23.

In the most preferred embodiment, chlorine formed during charging of a zinc chloride battery with an aqueous zinc chloride electrolyte is converted to chlorine hydrate. The hydrate is then stored and is available for discharge by decomposing the chlorine hydrate to chlorine and water.

The halogen hydrate formation apparatus necessary for forming and storing the halogen hydrate during the charging and discharging of the electrical energy storage device is assembled to the remaining apparatus of FIG. 1. Any conventional equipment may be used such as that described in U.S. Pat. No. 3,713,888; 3,823,036; or Electric Power Research Institute and Department of Energy reports discussed supra.

Having described the invention in general, listed below are preferred embodiments where all temperatures are in degrees Centigrade and all parts are parts by weight unless otherwise indicated.

EXAMPLE 1

A Kynar (trademark of Pennwalt Company for a fluoroplastic material) electrode assembly was machined to the configuration of FIG. 8 incorporating various degrees of differential masking in order to evaluate their effectiveness in controlling the discharge edge activity in a zinc chlorine chlorine hydrate EESD. The evaluation was performed in a test cell consisting of two pairs of mechanically framed chlorine electrodes (4 in. $\times$ 2.65 in. $\times$ 0.080 in.) and three zinc electrodes (4 in. $\times$ 2.745 in $\times$ 0.390 in.). The exposed apparent area for each chlorine electrode after framing (longitudinal face) is calculated to be 61.3 cm$^2$ (245.2 cm$^2$ per cell). The exposed apparent area for each zinc electrode is calculated to be 65.9 cm$^2$ per face. Two porous graphite electrodes (Union Carbide PG-60) were inserted into the Kynar frame. The cavity between the longitudinal (exterior) faces of the chlorine electrode is 0.08 in. The temperature of the electrolyte was controlled by circulating the electrolyte through a titanium coil immersed in a constant temperature water bath and held at a temperature of 30° C.$\pm$0.5° C. The volume of electrolyte used was approximately 800 milliliters. In the charge mode, chlorine gas produced electrochemically was vented from the sump. In the discharge mode, the required chlorine gas was fed to the sump via a gas dispersion tube from a chlorine gas cylinder.

Both the charge and discharge processes were operated under constant current. Cell voltage was measured using two voltage probes, separate from the current carrying terminal located at the top of the chlorine and zinc bus bars. The operating conditions are as follows:

TABLE I

| | |
|---|---|
| Charge: | 5 hrs at 27 mA/cm$^2$ (i.e. 6.62 amp) |
| Discharge: | to 0 volt at 40 mA/cm$^2$ (i.e. 9.8 amp) |
| Chlorine Electrode Area | 245.2 cm$^2$ |
| Electrolyte: | Before charge: 25% ZnCl$_2$ (2.3M) pH: 0.18 |
| Flow rate: | 2 ml/cm$^2$/min |
| Cl$_2$ concentration: | approximately 2 g/l |

The external shoulder (mask) size was held constant at 0.05 in. (mechanical masking on longitudinal face of the chlorine electrode) while the size of the internal shoulder (mask) was varied to obtain the various differential mask sizes (interior face). To determine the effectiveness of varying the internal and external mechanical screening or mask, the internal mask had an increase in size over the external mask of 0.05 in. (1.27 mm), 0.09 in. (2.29 mm), 0.20 in. (5.08 mm) and 0.45 in. (11.43 mm). All tests were conducted with the same electrodes under the same operating conditions. The effect of differential masking on the charge profile was negligible except to the extent that a good uniform smooth deposit of zinc was obtained. Most significantly were the losses in zinc area coverage at the various discharge steps as is shown below in Table 2.

TABLE 2

Effect of Differential Masking On The Area Loss of Zinc Coverage

| Mask (Inches) | | | Area Loss of Zinc Coverage (%) at Discharge Depth of | | |
|---|---|---|---|---|---|
| Differential | Internal | External | 50% | 75% | 90% |
| 0.05 | 0.10 | 0.05 | 5 | 12 | 46 |
| 0.09 | 0.14 | 0.05 | 3 | 8.25 | — |

TABLE 2-continued

Effect of Differential Masking On
The Area Loss of Zinc Coverage

| Mask (Inches) | | | Area Loss of Zinc Coverage (%) at Discharge Depth of | | |
|---|---|---|---|---|---|
| Differential | Internal | External | 50% | 75% | 90% |
| 0.20 | 0.25 | 0.05 | 3 | 4 | 13 |

Observation of the zinc metal during various stages of discharge is quite signigicant. At 50% depth of discharge, a patch-type zinc plate had already developed. The size and shape of the zinc patch was similar for all differential mask sizes evaluated. At this stage of discharge, the top edge plate started baring of zinc, averaging 3% loss of zinc area.

At 75% depth of discharge, the size and shape change of the zinc deposits had become more significant. The decrease in area coverage of zinc was 12% for 0.05 in. differential mask, 8.25% for the 0.09 in. differential mask and 4% for the 0.20 in. differential mask. It is seen that the difference in shape between 50% and 75% depth of discharge was relatively small for 0.20 in. differential mask, but significantly large for 0.05 in. differential mask.

At 90% depth of discharge, a very well defined zinc patch had developed, the decrease in area coverage of zinc being 46% for 0.05 in. differential mask as compared to 13% for 0.20 in. differential mask. At this stage of discharge, the area coverage of zinc for 0.20 in. differential mask is still considered to be satisfactory.

In the case of the 0.45 in. differential mask, the graphite subatrate at about 90% depth of discharge showed a reverse shaped patch. The center portion was bare of zinc implying an over-mask effect.

While applicant does not wish to be held to any theory, it is believed that with a porous electrode, i.e., a flow-through mode of operation, a portion of the chlorine electrode surface, behind the physical external mask, is participating in chlorine reduction resulting in localized increased current along the external mask edges which causes an increase in the rate of anodic dissolution at the edges aof the zinc electrode. Increasing the size of the differential mask decreases the usable area behind the masks and compensates for the otherwise higher edge activity on discharge. This is reflected in all three of the experimental criteria selected for evaluating the differential masking approach to controlling edge activity on discharge. As can be seen from the above example, although the 0.45 in. differential mask size displayed a satisfactorily flat discharge profile, its average discharge voltage and coulombic efficiency were low. An over-mask effect was confirmed by visual inspection of the zinc deposit near the end of the discharge. The differential mask size of 0.20 in. was the most effective for retaining the shape of the zinc deposit near the end of the discharge and at the same time giving a satisfactory discharge profile.

It is to be appreciated that the physical mask can be manufactured in any practical means, such as injection molding the fluoroplastic Kynar or similar inert materials as polyvinyl chloride or polyester resins.

It is to be appreciated that FIG. 8 shows the masking to have been located at the base of the porous electrode. It should be appreciated that the physical masking may be on the side of the oxidant electrode as in FIG. 8 or at the top of the oxidant electrode, depending upon how one wishes to insert the oxidant into the porous electrode. Alternatively, the internal screening or mask may be on all sides of the porous oxidant electrode depending on the oxidant employed and the utilization of a flowing electrolyte. The masking may also take the form of a coating of an inert substance onto the interior and longitudinal (exterior) faces of the porous electrode.

What is claimed is:

1. A method of discharging an electrical energy storage device comprising the steps;
   1. providing a first electrode comprised on an electrochemically reducible substance;
   2. providing a porous electrode having a first and second exterior face with a cavity formed in the interior between said exterior faces, thereby having first and second interior faces positioned opposite the first and second exterior faces;
   3. providing a current carrying electrolyte between said electrodes;
   4. passing an oxidant through said porous electrode;
   5. screening the porous electrode thereby decreasing its electrochemical activity by blocking the interior face a greater amount than the respective exterior face of the porous electrode, thereby maintaining a differential of electrode surface area between the interior face and the exterior face; and
   6. closing the circuit between the first electrode and the porous electrode, thereby oxidizing the substance at the first electrode and reducing the oxidant at the porous electrode.

2. The method of claim 1 wherein the screening means is a W-shaped plastic material.

3. The method of claim 1 wherein the porous electrode is comprised of a carbonaceous material.

4. The method of claim 1 wherein the porous electrode is comprised of a film forming metal.

5. The method of claim 1 wherein the differential between the screening of the exterior face and the interior face of the porous electrode ranges from 0.05 in. (1.27 mm) to 0.30 in. (7.62 mm).

6. The method of claim 1 wherein the first electrode is comprised of a metal; and the oxidant is a halogen.

7. The method of claim 6 wherein the first electrode is comprised of zinc and the oxidant is chlorine.

8. The method of claim 1 wherein the electrical energy storage device is a metal, halogen, halogen hydrate device.

9. The method of claim 1 wherein the electrolyte is an aqueous electrolyte.

* * * * *

UNITED STATES PATENT OFFICE
CERTIFICATE OF CORRECTION

Patent No. 4,241,150          Dated December 23, 1980

Inventor(s) Peter Carr and Chen H. Chi

It is certified that error appears in the above-identified patent and that said Letters Patent are hereby corrected as shown below:

In Column 8, Line 19, Claim 1, delete "on" and insert --- of ---.

In Column 8, Claim 8, delete the numerical reference "1" and insert --- 6 ---.

In Column 8, Claim 9, delete the numerical reference "1" and insert --- 6 ---.

Signed and Sealed this

Twenty-eighth Day of April 1981

[SEAL]

Attest:

RENE D. TEGTMEYER

Attesting Officer      Acting Commissioner of Patents and Trademarks

UNITED STATES PATENT AND TRADEMARK OFFICE
CERTIFICATE OF CORRECTION

PATENT NO. : 4,241,150
DATED : December 23, 1980
INVENTOR(S) : Peter Carr et al.

It is certified that error appears in the above—identified patent and that said Letters Patent is hereby corrected as shown below:

In Column 1, between lines 8 and 9, add the following:

--- The Government of the United States of America has rights in this invention pursuant to Contract No. DE-AC02-76ET20131 awarded by the U. S. Department of Energy. ---

*Signed and Sealed this*

*Thirtieth* Day of *June 1981*

[SEAL]

Attest:

RENE D. TEGTMEYER

*Attesting Officer*  *Acting Commissioner of Patents and Trademarks*